United States Patent [19]

Hering

[11] 4,077,189

[45] Mar. 7, 1978

[54] FRONT MOUNTED ADJUSTABLE TWIN RAKES

[76] Inventor: Walton C. Hering, Rte. 2, Lott, Tex. 76656

[21] Appl. No.: 679,667

[22] Filed: Apr. 23, 1976

[51] Int. Cl.$^2$ .................... A01D 77/04; A01D 43/02
[52] U.S. Cl. ...................... 56/11.9; 56/341; 56/346; 56/377
[58] Field of Search .......... 56/377, 376, 375, 341–343, 56/11.9, 10.6, 346

[56] References Cited

U.S. PATENT DOCUMENTS

| | | | |
|---|---|---|---|
| 1,704,190 | 3/1929 | Hall | 56/346 |
| 1,877,770 | 9/1932 | Larson | 56/12.4 |
| 2,509,430 | 5/1950 | Guy | 56/355 |
| 2,602,280 | 7/1952 | Crowe et al. | 56/377 |
| 2,670,588 | 3/1954 | Plant | 56/377 |
| 2,731,782 | 1/1956 | Mason | 56/11.9 |
| 2,893,192 | 7/1959 | Tallman | 56/10.6 |
| 2,929,187 | 3/1960 | Boggio | 56/11.9 |

*Primary Examiner*—Russell R. Kinsey

*Attorney, Agent, or Firm*—Clarence A. O'Brien; Harvey B. Jacobson

[57] ABSTRACT

A farm tractor apparatus having twin front mounted adjustable hay rakes supported on the front of a conventional-type farm tractor and a hay baler mounted for pulling by said same tractor. The twin hay rakes will produce double windrows for reception by the towed hay baler of the rolled bale type for simultaneously baling two rows of hay. The hay rakes have adjustment means at the rear portions thereof to vary the width and size of the windrows produced as well as front adjustment means for varying the overall sweep width and the front expanse in order to drive the apparatus over normal roads and through normal size gate structures. The hay rakes are of the floating type and have gauge and support rollers associated therewith and being part of the combination. A feature of this invention is in the provision of hydraulic power means for allowing the tractor operator to make some of the aforementioned adjustments while in the driver's seat.

4 Claims, 7 Drawing Figures

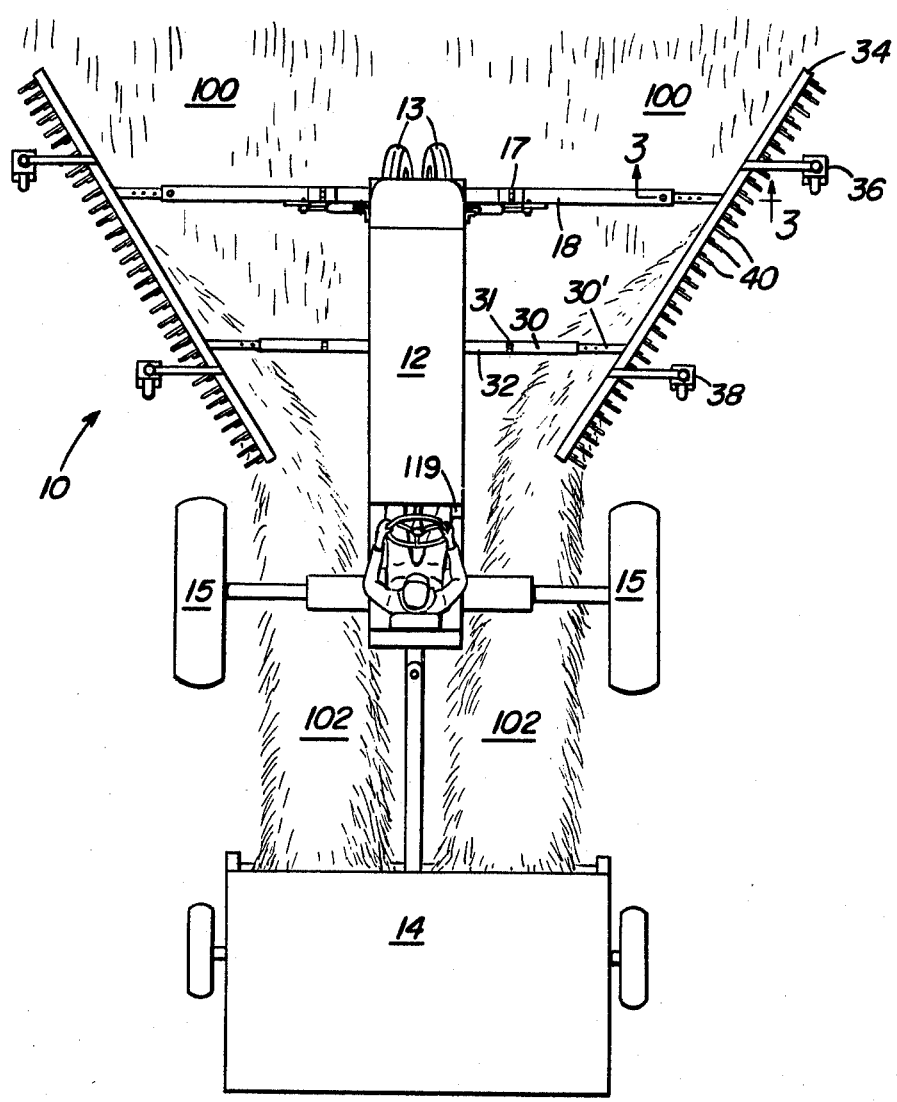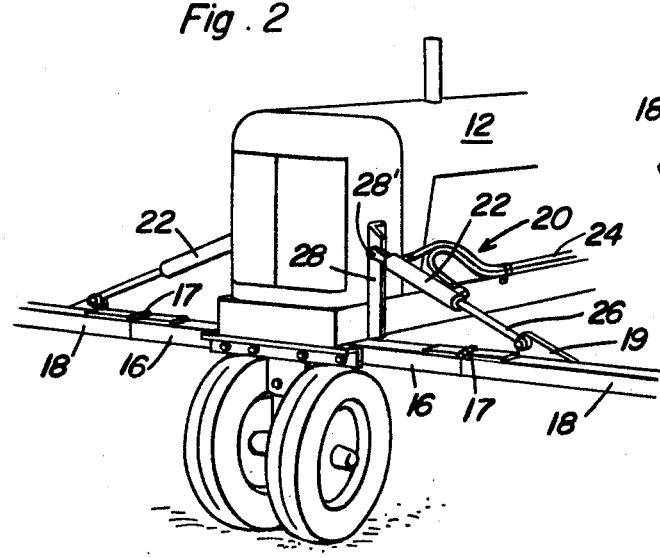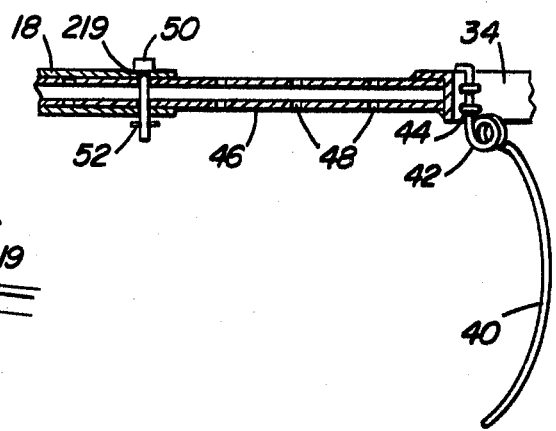

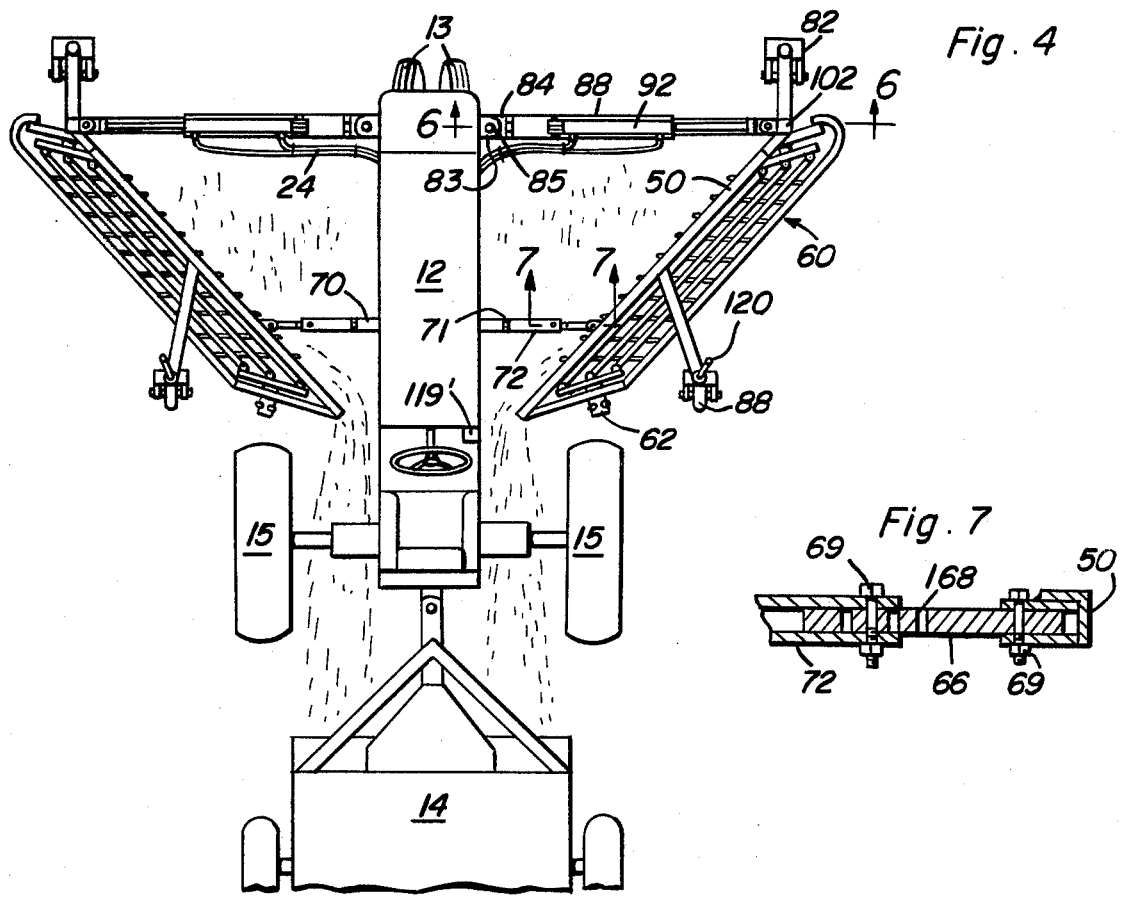
Fig. 4
Fig. 7
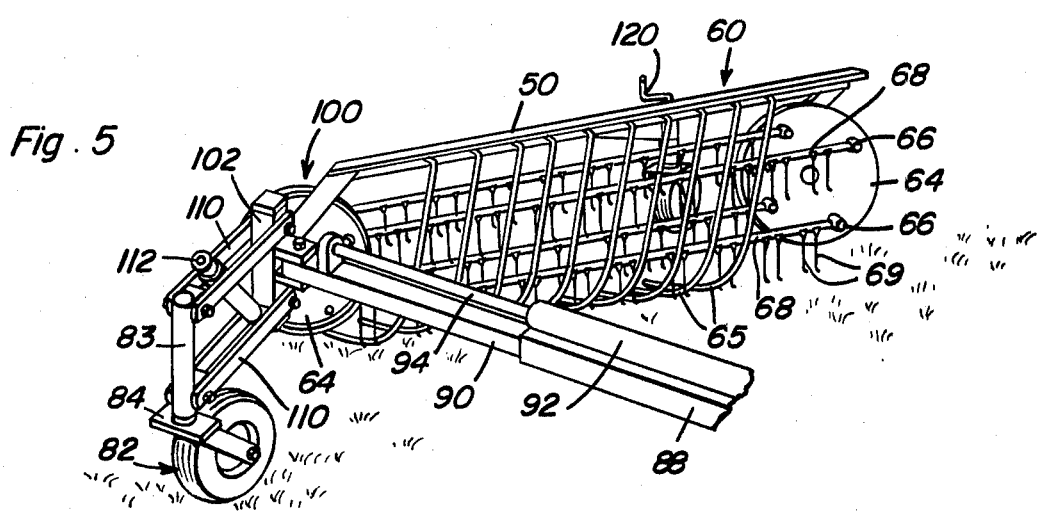
Fig. 5
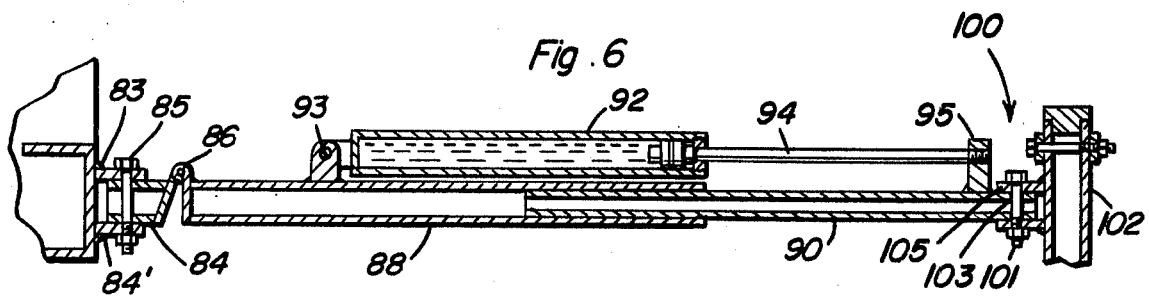
Fig. 6

FRONT MOUNTED ADJUSTABLE TWIN RAKES

BACKGROUND OF THE INVENTION

1. Field of the Invention

This invention relates generally to tractor supported and driven farm implements for raking hay and the baling of said hay into roll-type bales.

2. Description of the Prior Art

A common problem with known type hay baling operations is that a first pass must be made by the bale operator in order to rake the scattered hay lying in the field into what is commonly known as windrows. Once the hay is piled into the windrows, a second pass is normally required in order to pick up and bale this hay. The purpose of this invention, in part, is to eliminate this double work requirement.

Another known problem with prior art devices is that they are not sufficiently adjustable to enable the tractor operator to make said adjustments and especially while on the move. Also, many times it is necessary with known devices that the tractor operator stop the tractor, get down from the operator's seat, and make any necessary adjustments to the associated implements by hand and this is both dangerous and also very tiring. With the invention as disclosed herein, the operator may remain in the operator's seat and make the ongoing adjustments therefrom.

Another problem with known prior art devices is that they are not as flexible and maintenance free as is desirable.

Known prior art U.S. Pat. Nos. which may be pertinent to this invention are as follows: 2,731,782, Jan. 24, 1956, 3,188,654, May 10, 1965, 1,704,190, Mar. 5, 1929.

None of these prior art devices offers the new and unique features of the invention disclosed herein.

SUMMARY OF THE INVENTION

An object of the present invention is to provide a hay rake attachment for use with farm-type tractors and the like which will be simple to operate and yet produce very desirable results.

Another object of the present invention is to produce a twin rake attachment for a farm-type tractor which is front mounted and completely adjustable for width and size of windrows produced.

A further object of this invention is to produce farm implement apparatus having in combination a tractor, twin mounted adjustable hay rakes on the front thereof, and a roll-type hay baler towed from the rear thereof. The overall purpose of this being to simultaneously produce twin windrows and then almost immediately thereafter roll these windrows of hay into roll-type bales. This will effectively eliminate one pass by the tractor operator as compared to conventional-type raking and baling operations.

A still further object of this invention is to provide front mounted adjustable twin hay rakes on a tractor together with adjusting means for both the rear portions of the rakes as well as the front portions of the rakes, and also to provide power assist means for decreasing the overall width of the operating device while moving in order for the entire tractor and apparatus mounted thereon to pass through normal width roadways and gates and the like.

The front mounted adjustable twin hay rake structure as disclosed herein has many advantages over previous hay rake structures. The common type hay rake structures are pulled from the rear drawbar of a conventional-type tractor and an operator must first make a pass over the hay field having cut hay lying thereon in order to rake said hay into windrows. Then, after the hay is raked into said windrows, the operator must again make another pass over the field with the hay baler towed behind the vehicle in order to pick up the hay and roll same into a bale. A very important feature of the device of this invention is that it eliminates entirely this second pass. That is, the hay is raked by the twin hay rakes mounted at the front of the tractor while the hay baler is being pulled from the rear thereof and almost simultaneously the hay is raked and rolled into the required size bales. This eliminates the second pass at obviously a great saving in time and expense.

Another important feature of this invention is that the hay rakes on each side of the tractor are individually adjustable both at the rear and front thereof so that the overall size and width of the windrows produced thereby may be effectively adjusted.

Another very important feature of this invention is that power assist means of a hydraulic type is provided so that the outwardly extending rakes and overall front width of the hay rakes is mounted on the tractor may be drawn inwardly to reduce the entire overall size or width thereof. This is necessary in order that the tractor may be moved from one field to another, or down a country road to an adjacent farm. In order to do this, obviously, the overall width must be no greater, or substantially no greater, than the width of the tractor wheels.

Another important feature of this invention is that the hay rakes are floatably mounted above pivot points from the tractor frame in order to allow the rakes to move up and down as they pass over uneven terrain. Guide or gauge rollers and support rollers also are provided which also may be adjustable in order to produce a better raking action.

A further feature of this invention is in the provision for either a single bar type prong mounted rake structure to be mounted on the tractor frame, or a new type portable support bar structure which is constantly reciprocating or moving to change the bars and prongs engaging and raking the hay in order to produce a much more effective and efficient hay windrow. The drive for said revolving or reciprocating type hay rake structure also may be of hydraulic power means driven from the normal tractor hydraulic system.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top view of the overall tractor implement arrangement of this invention.

FIG. 2 is a perspective view of just the front part of said tractor and the associated connecting mechanism for the rakes of FIG. 1.

FIG. 3 is an enlarged cross-sectional view of a simple form of the hay rake structure of this invention.

FIG. 4 is a top view of another embodiment of the tractor implement arrangement of this invention.

FIG. 5 is a perspective view of the reciprocating and moving rake mechanism as depicted in FIG. 4.

FIG. 6 is an enlarged cross-sectional view taken generally along line 6—6 of FIG. 4.

FIG. 7 is an enlarged cross-sectional view taken generally along line 7—7 of FIG. 4.

DESCRIPTION OF THE PREFERRED EMBODIMENT

Referring to FIG. 1 of the drawings, reference numeral 10 indicates in general the tractor and implement arrangement of this invention. As shown, a tractor 12 having front wheels 13 and wide spaced rear wheels 15 is pulling, by a conventional-type drawbar connection, a roll-type hay baler 14 and has mounted on the front portion of the tractor twin hay rakes. These twin hay rakes are expanded or divergent forwardly as shown so that the cut hay 100 will be collected and raked inwardly by same to produce the windrows 102. These twin windrows then will be simultaneously bailed into roll-type bales by the hay baler 14. Thus, as can be visualized, the tractor operator need only make a single pass over the field in order to both rake and bale twin windrows and twin roll bales at the same time.

Looking at FIG. 2, one embodiment of this invention is depicted. Short support members 16 are welded or appropriately attached to the front of a conventional type farm tractor. Also, a single bar may be mounted passing through or under the front tractor frame and attached thereto as long as short ends 16 such as those shown in FIG. 2 are produced. These ends 16 are then attached by pivot hinges 17 to the main support arms 18 for the front of the hay rake structure. A flange 19 provided on the section of member 18, adjacent the pivot hinge 17, is connected to a piston rod 26 associated with a piston head within the hydraulic chamber 22. Reference numeral 20 indicated the overall hydraulic piston system. A flange bracket 28 is appropriately welded or fastened by conventional means to the front of the tractor and a pivot pin 28' attaches the inner end portion of the hydraulic cylinder pivotally thereto. Appropriate hydraulic lines 24 from the conventional hydraulic system of the tractor are provided and obviously appropriate controls are installed for operation by the operator upon the tractor dash as indicated by 119.

Looking at FIG. 3, the outer telescoping-type adjustment structure for the front portion of the twin rakes will be described. The member 18 of either square, rectangular or round cross section receives a similar shaped telescoping tube 46 therewithin. The telescoping portion 46 will be just slightly smaller than the outer main support member 18, as best seen in FIG. 3. The telescoping tube 46 is appropriately provided with apertures 48 passing completely therethrough for alignment with a similar set of apertures 219 in the main support member 18. Thus a locking and retaining pin 50 with suitable lock means 52, as is conventional with farm-type implements, will normally retain the two sections of adjustable tube in position as adjusted and set. Mounted on the outermost end of the tube 46 is the main hay rake support member 34. Mounted along the main hay rake support member 34 at appropriately spaced intervals are prong hay engaging members 40, suitably suspended by spring portions 42 from fastening clamps 44. Looking at FIG. 1, the guide and gauge roller wheels 36 and 38 may be seen.

The rear portion of the main hay rake support member 34 is supported by another telescopic member 30 pivotally connected by hinge 31 to short mounting tubes 32 appropriately fastened to the tractor at the mid-section of the engine compartment. The tube section 30 is also provided with a telescoping inner portion 30' which is similar to the structure above described for FIG. 3. Apertures and pins like 18 and 219 above may be used to secure same together.

As can be visualized the pivot means 17 and 31 for the supporting structures permit the twin hay rakes to ride up and down, or float as it were, by means of the gauge wheels 36 and 38 as the tractor passes over uneven land contours. The hydraulic cylinders 22 permit the operator to pivot the forward support structures about pivot means 17 in order to lift and bring the outer ends of the twin hay rakes into transport position at the front of the tractor. This is an extremely important feature in order for the tractor operator to be able to pass through normal width gates and traverse normal sized country roads.

Looking at FIGS. 4-7, another embodiment of this invention will be described. This embodiment is somewhat more complicated than the above described embodiment, but it offers many additional features thereover. Again, like reference numerals have been used for the tractor, the mounting wheels and drive wheels therefor, as well as the roll-type hay baler 14. The twin hay rakes, indicated in general by reference numeral 60 in this embodiment, are of the rotating or reciprocating type. That is, the pronged rake members 69 are similar to the ones 40 described in FIG. 3 above, but are suitably fastened to a plurality of support bars 68. Four of these bars 68 are shown in FIG. 5, but more or less than this may obviously be used. A support structure comprises the rotatable discs 64 at each end of the plurality of bars 68 which are pivotally connected thereto by means 66. Any conventional-type support structure may be provided for the rotatable discs 64 and will not be shown or described in detail herein.

A drive motor 62, in FIG. 4, is normally provided in order to cause the rotation of at least one of the discs 64. The drive motor 62 is preferably of the hydraulic type so as to be connected and operated from the conventional hydraulic pressure system of the tractor. Ribs 65 are normally also provided adjacent the prong teeth 69 for protection and more effective action. Attached to the support frame 50 is a rear gauge roller wheel 88 having a screw adjustment lever 120 for raising or lowering said wheel in its respective supporting structure in a conventional manner.

Looking at FIGS. 4 and 7 of the drawings, the rear adjustable support structure for the twin hay rakes will now be described. Short stubs 70 are appropriately welded or fastened to the mid-section of the tractor frame and are provided with pivot or hinge means 71 which in turn is attached to tubular members 72. Again, the tubular member 72 may be square, rectangular or round in cross section as desired. Mounted telescopically within the tube section 72 is a telescoping member 66 which is engageable with the rake support structure 50. A pin or bolt and nut combination 69 appropriately fasten the outer end of telescoping member 66 to the rake support frame (FIG. 7). Four adjustment apertures 168 are appropriately provided along the inner portion of the telescoping member 66 for engagement with a similar aligned set of aperture holes, and a locking pin or nut-bolt 69, similar to that already described in FIG. 3. This adjustment and pivot arrangement permits the rear portion of the hay rake structure to be adjusted inwardly or outwardly to change the windrow size and alignment, and also permits a floating action of the rake as the rear portion is supported by the gauge wheels 88.

Looking at FIGS. 4, 5 and 6 the front adjustment 100 and power assist means will be described. A shock structure 112 is also shown in FIG. 5. Again, short sections 84 are appropriately fastened at the front part of the tractor by welding 83, or other suitable fastening means, and connected by pivot means 86 to a main support tubular member 88. A pivot pin or bolt 85 also permits a slight play or action between the main support portion 84 and the flanges 84', see FIG. 6. The tubular portion 88 has telescopically mounted therewithin a member 90 which is attached to the front hay rake support structure 102 by flange means 105. Again, appropriate structure is provided so that the tubular member may be releasably attached by the flange means 105 through apertures 103 provided at the end of member 90, and locking bolt and nut 101. An extending portion 95, welded to the tubular member 90, is appropriately attached by screw threads or other means to a cylinder rod 94 mounted within the hydraulic cylinder 92. The other end of the hydraulic cylinder is pivotally mounted at 93 to the main tubular member 88. Again, the hydraulic piston cylinders 92 are appropriately connected to the hydraulic pressure system to the tractor by flexible coupling means 24' and a control panel 19' as best seen in FIG. 4.

Thus, it can be envisioned how the twin windrows may be adjusted by the tractor operator before beginning an overall raking and baling operation, and then it is not necessary for the operator to leave his seat again, even though he may travel from one field to another through normal gates or roadways. It is merely necessary to operate the hydraulic system in order to decrease the overall width of the twin rake structure and then to pass through a normal width gate. This accomplishes a great saving in both time and effort.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A farm implement arrangement having an engine driven tractor with wide spaced driven rear wheels, a towed hay baler mounted behind the tractor for baling hay into rolls, and means for mounting the baler for towed movement with the tractor, the improvement comprising adjustable hay rake means mounted on the front of the tractor for raking hay into windrows, the adjustable hay rake means including two substantially identical longitudinally extending hay rake structures pivotally attached to the tractor, one structure on each side of the tractor, pivotal attachment means for mounting each of the hay rake structures to the tractor for permitting flotation thereof as the hay rake means moves over a field surface of uneven contour, the pivotal attachment means including telescoping tubes, an adjustable retainer pin for locking said tubes once adjusted, a hinge connection to the tractor, a gauge wheel on the outer portion of each of the hay rake structures to permit floating thereof over uneven land contours, telescoping adjusting structure disposed between each of the hay rake structures and the tractor to permit the size of the windrow formed by each hay rake structure to be varied, the telescoping adjusting structure including hydraulic power means for varying the front overall width of the hay rake structures from the operator's seat of the tractor while the tractor is moving, and means associated with the hay rake structures for permitting operation thereof by the tractor operator without leaving the operating position on the tractor seat, whereby two windrows are simultaneously produced by the hay rake structures and two baled rolls are simultaneously produced by the hay baler.

2. The structure as set forth in claim 1, wherein each of the hay rake structures include at least one bar having fixed-type spring-like pronged hay rakes mounted on the bar.

3. The structure as set forth in claim 2, wherein a plurality of similar bars having the hay engaging prongs mounted thereon are provided, power means with moving support structure associated with the hay tines structure and connected to said plurality of bars for causing a movement thereof transversely to the overall direction of operation of the tractor and hay rake structure in order to effect a better raking action.

4. The structure as set forth in claim 3, wherein a front guide wheel is associated with the front mounting structure, said front mounting structure being pivotally mounted to permit floating of the front of the rake structure, a rear gauge wheel is provided for each of the rear portions of the rake structure, and the rear gauge wheels have vertical adjusting means therefor.

* * * * *